(12) United States Patent
Hashimoto et al.

(10) Patent No.: US 11,359,636 B2
(45) Date of Patent: Jun. 14, 2022

(54) VACUUM PUMP AND DIAGNOSIS SYSTEM

(71) Applicant: SHIMADZU CORPORATION, Kyoto (JP)

(72) Inventors: Toshifumi Hashimoto, Kyoto (JP); Nobuhiko Moriyama, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 227 days.

(21) Appl. No.: 16/401,947

(22) Filed: May 2, 2019

(65) Prior Publication Data

US 2019/0383296 A1    Dec. 19, 2019

(30) Foreign Application Priority Data

Jun. 14, 2018   (JP) .............................. JP2018-113745

(51) Int. Cl.
| | | |
|---|---|---|
| *F04D 19/04* | (2006.01) | |
| *F04D 27/00* | (2006.01) | |
| *F04D 29/059* | (2006.01) | |
| *G01M 13/045* | (2019.01) | |

(52) U.S. Cl.
CPC ......... *F04D 27/001* (2013.01); *F04D 19/042* (2013.01); *F04D 29/059* (2013.01); *G01M 13/045* (2013.01)

(58) Field of Classification Search
CPC ............. F04D 19/04–08; F04D 17/168; F04D 29/059; G01M 13/045
See application file for complete search history.

(56) References Cited

U.S. PATENT DOCUMENTS

| | | | | |
|---|---|---|---|---|
| 5,479,201 A | * | 12/1995 | Sugiura .................... | G02B 5/09 347/242 |
| 6,709,226 B2 | * | 3/2004 | Maejima ................. | F04D 19/04 415/118 |
| 8,690,525 B2 | * | 4/2014 | Ohtachi ............... | F04D 27/001 415/119 |
| 2011/0103934 A1 | | 5/2011 | Ohtachi et al. | |
| 2012/0034066 A1 | * | 2/2012 | Kogame ................. | F04D 19/04 415/90 |
| 2012/0209569 A1 | * | 8/2012 | Becourt ............. | G05B 23/0245 702/183 |

FOREIGN PATENT DOCUMENTS

| | | |
|---|---|---|
| CN | 102155425 A | 8/2011 |
| CN | 102456419 A | 5/2012 |
| EP | 0851127 A2 | 7/1998 |
| JP | 3172822 | 12/2011 |
| JP | 2011247253 A | 12/2011 |
| JP | 2012530875 A | 12/2012 |

(Continued)

OTHER PUBLICATIONS

Vibration Sensors (Year: 1999).*

(Continued)

*Primary Examiner* — Christopher Verdier
*Assistant Examiner* — Maxime M Adjagbe
(74) *Attorney, Agent, or Firm* — Renner, Otto, Boisselle & Sklar, LLP

(57) ABSTRACT

A vacuum pump comprises: a rotor; a stator; a rolling bearing configured to support a rotor shaft provided at the rotor; and a vibration sensor configured to detect vibration of the rolling bearing.

7 Claims, 7 Drawing Sheets

(56) References Cited

FOREIGN PATENT DOCUMENTS

WO    2010007975  A1    1/2010

OTHER PUBLICATIONS

Office Action for corresponding CN Application No. 201910408763.2 dated Feb. 26, 2021, with English language translation.
Office Action for corresponding CN Application No. 201910408763.2 dated Jul. 27, 2020, with English language translation.
Office Action for corresponding JP Application No. 2018-113745 dated Jul. 30, 2021, with English language translation.

* cited by examiner

VACUUM PUMP AND DIAGNOSIS SYSTEM

BACKGROUND OF THE INVENTION

1. Technical Field

The present invention relates to a vacuum pump and a diagnosis system.

2. Background Art

Typically, a vacuum pump configured such that a rotor is supported by a rolling bearing has been known (see, e.g., Patent Document 1 (JP-A-2011-247253)). The vacuum pump described in Patent Document 1 is a turbo-molecular pump, and is generally operated by high-speed rotation such as several tens of thousands of rotations per minute.

As described above, in the turbo-molecular pump to be operated by high-speed rotation, a rolling bearing for supporting a rotor is replaced on a regular basis before the rolling bearing comes to the end of one's life due to deterioration. For this reason, it is important to control bearing replacement timing.

SUMMARY OF THE INVENTION

A vacuum pump comprises: a rotor; a stator; a rolling bearing configured to support a rotor shaft provided at the rotor; and a vibration sensor configured to detect vibration of the rolling bearing.

The vacuum pump, further comprises: a base provided with the rolling bearing; and a circuit board directly fixed to the base or fixed to the base through other members, the vibration sensor being mounted on the circuit board. A resonant frequency of the circuit board is set higher than a frequency range of vibration of the rolling bearing.

The circuit board is made of metal.

The vacuum pump further comprises: a base provided with the rolling bearing; and a back cover fixed to the base and including a back cover main body, an insulating layer, and a wiring layer. The vibration sensor is mounted on the wiring layer of the back cover, and a resonant frequency of the back cover is set higher than a frequency range of vibration of the rolling bearing.

A diagnosis system comprises: a diagnosis section configured to make, based on vibration detection information output from the vibration sensor provided at the vacuum pump according to claim 1, a diagnosis on a presence or absence of deterioration of the rolling bearing.

The diagnosis system further comprises: an FFT section configured to perform FFT processing for data output from the vibration sensor, thereby acquiring a peak at a rotor rotation frequency and a peak at a bearing vibration frequency regarding a component forming the rolling bearing. The diagnosis section makes the diagnosis on the presence or absence of deterioration of the rolling bearing based on the peak at the bearing vibration frequency among the peaks acquired by the FFT section.

The diagnosis system further comprises: a storage section configured to store frequency correlation information on a relationship between the rotor rotation frequency and the bearing vibration frequency. The diagnosis section identifies the bearing vibration frequency based on a current rotor rotation frequency and the frequency correlation information stored in the storage section, thereby making the diagnosis on the presence or absence of deterioration of the rolling bearing based on the peak at the identified bearing vibration frequency.

The diagnosis system further comprises: a storage section configured to store a threshold. The diagnosis section makes such a diagnosis that the rolling bearing has been deteriorated when the peak at the bearing vibration frequency is determined to be equal to or higher than the threshold stored in the storage section.

According to the present invention, vibration information for accurately recognizing deterioration of a rolling bearing can be obtained.

DETAILED DESCRIPTION OF THE EXEMPLARY EMBODIMENTS

Hereinafter, embodiments of the present invention will be described with reference to the drawings.

First Embodiment

Figure 1:
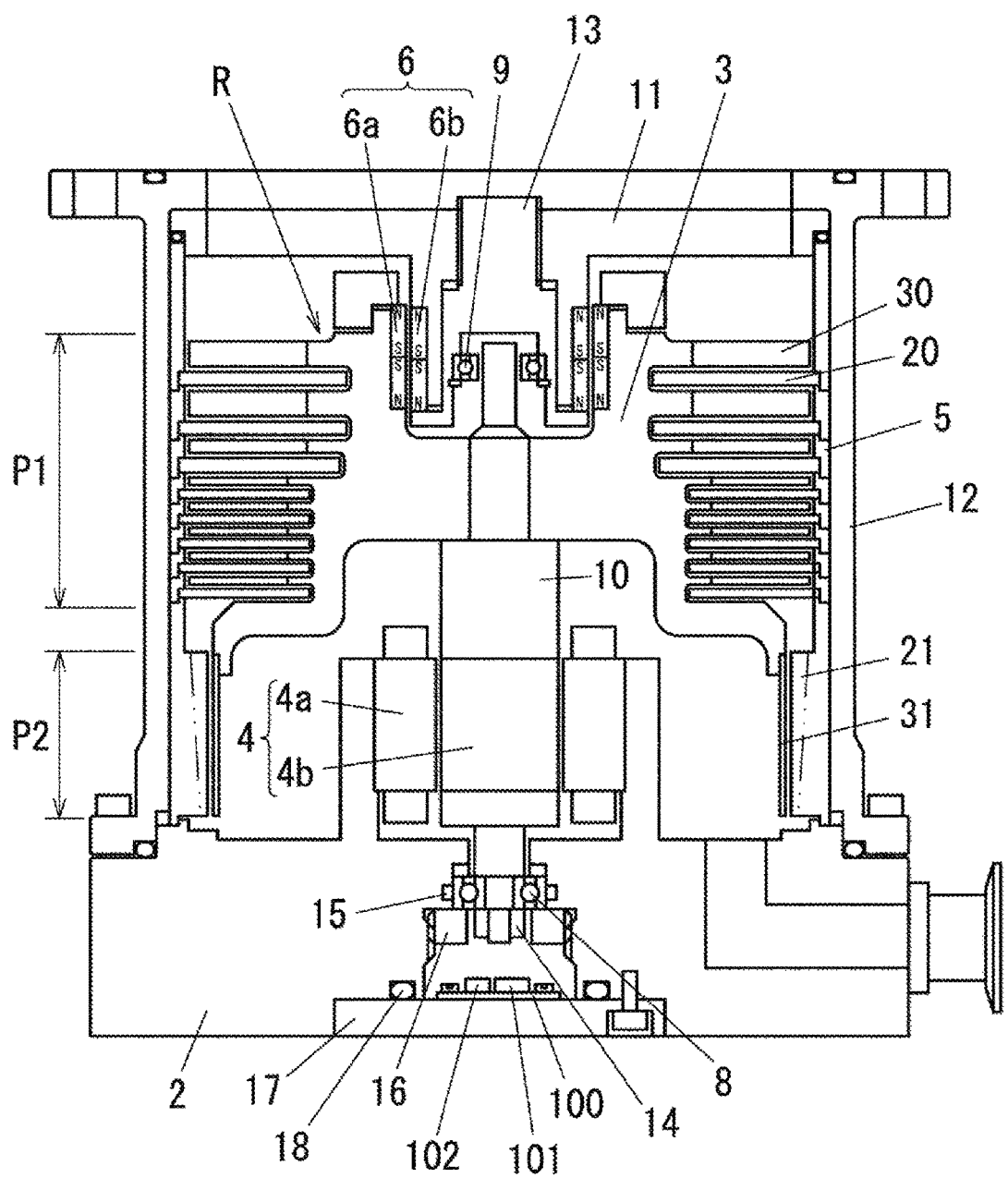
FIG. 1 is a view of a first embodiment of a vacuum pump according to the present invention.

FIG. 1 is a view of a first embodiment of a vacuum pump according to the present invention, and is a sectional view of a turbo-molecular pump 1. Note that a power device configured to supply power is connected to the turbo-molecular pump 1, but is not shown in FIG. 1.

The turbo-molecular pump 1 illustrated in FIG. 1 includes, as exhaust functions, a turbo pump section P1 having turbine blades, and a Holweck pump section P2 having a spiral groove. Needless to say, the present invention is not limited to the vacuum pump including the turbo pump section P1 and the Holweck pump section P2 as the exhaust functions, and is also applicable to a vacuum pump including only turbine blades, a vacuum pump including only a drag pump such as a Siegbahn pump or a Holweck pump, or a combination thereof.

The turbo pump section P1 includes multiple stages of rotor blades 30 formed at a pump rotor 3, and multiple stages of stationary blades 20 arranged on a base 2 side. On the other hand, the Holweck pump section P2 provided on an exhaust downstream side of the turbo pump section P1 includes a cylindrical portion 31 formed at the pump rotor 3, and a stator 21 arranged on the base 2 side. The spiral groove is formed at an inner peripheral surface of the cylindrical stator 21. The multiple stages of the rotor blades 30 and the cylindrical portion 31 form a rotary-side exhaust function, and the multiple stages of the stationary blades 20 and the stator 21 form a stationary-side exhaust function.

The pump rotor 3 is fastened to a shaft 10, and the shaft 10 is rotatably driven by a motor 4. For example, a DC brushless motor is used as the motor 4. A motor stator 4b is provided at a base 2, and a motor rotor 4a is provided on a shaft 10 side. A rotor unit R including the shaft 10 and the pump rotor 3 is rotatably supported by a permanent magnet magnetic bearing 6 using permanent magnets 6a, 6b and a ball bearing 8 as a rolling bearing.

The permanent magnets 6a, 6b are ring-shaped permanent magnets magnetized in an axial direction. The multiple permanent magnets 6a provided at the pump rotor 3 are arranged in the axial direction such that those with the same polarity face each other. On the other hand, the multiple stationary-side permanent magnets 6b are attached to a magnet holder 11 fixed to a pump case 12. These multiple permanent magnets 6b are also arranged in the axial direction such that those with the same polarity face each other. The axial position of the permanent magnet 6a provided at the pump rotor 3 is set slightly higher than the position of the permanent magnet 6b arranged on an inner peripheral side of the permanent magnet 6a. That is, the magnetic pole of the rotary-side permanent magnet is, by a predetermined amount, shifted in the axial direction with respect to the magnetic pole of the stationary-side permanent magnet. Depending on the magnitude of the predetermined amount, support force of the permanent magnet magnetic bearing 6 varies. In an example illustrated in FIG. 1, the permanent magnets 6a are arranged on an upper side as viewed in the figure, and therefore, support force in a radial direction and upward (a direction toward a pump exhaust port) force in the axial direction act on the rotor unit R due to repulsive force of the permanent magnets 6a and the permanent magnets 6b.

A bearing holder 13 configured to hold a ball bearing 9 is fixed to the center of the magnet holder 11. Grease is sealed in the ball bearing 8. The ball bearing 9 functions as a touchdown bearing configured to limit radial runout of a shaft upper portion. In a steady rotation state, the shaft 10 and the bearing 9 do not contact each other. In a case where great disturbance is applied or whirling of the shaft 10 becomes greater upon acceleration or deceleration of rotation, the shaft 10 contacts the ball bearing 9.

An inner ring of the ball bearing 8 is fixed to the shaft 10 with a nut 14, and an outer ring of the ball bearing 8 is fixed to the base 2 with a nut 16. A ring-shaped radial damper 15 is provided on an outer peripheral side of the ball bearing 8. Elastomer such as rubber is used as the material of the radial damper 15.

A housing space of the base 2 for housing the ball bearing 8 is sealed with a back cover 17 and a sealing member 18. A circuit board 100 is screwed to an inner peripheral surface of the back cover 17. Circuit components such as an acceleration sensor 101 as a vibration sensor configured to detect vibration of the ball bearing 8 and a microcomputer 102 are mounted on the circuit board 100. Vibration of the ball bearing 8 is transmitted to the acceleration sensor 101 on the circuit board 100 through the base 2 and the back cover 17.

A metal printed circuit board called a metal base substrate is used as the circuit board 100. The metal base substrate is configured such that an insulating layer is formed on base metal such as aluminum or copper and an external layer circuit is made of copper foil on the insulating layer. The metal base substrate has higher stiffness than that of a normal glass epoxy resin substrate. The size of the circuit board 100 is set as small as possible such that the resonant frequency of the circuit board 100 on which the circuit components (the acceleration sensor 101, the microcomputer 102 and the like) are mounted becomes lower. For example, the circuit board 100 is a square with a side length of about 30 mm.

Figure 2:
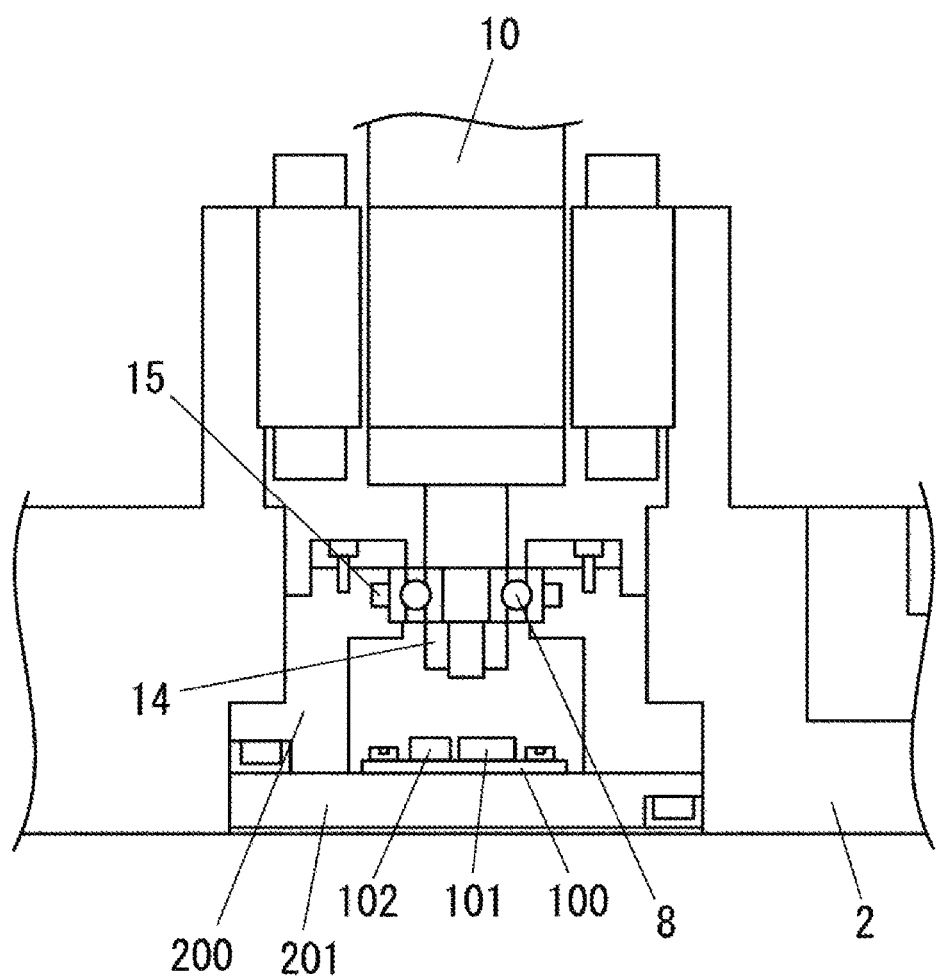
FIG. 2 is a view of another example regarding circuit board arrangement.

FIG. 1 illustrates the case of a configuration in which the outer ring of the ball bearing 8 is directly provided at the base 2, but it may be configured such that the outer ring of the ball bearing 8 is fixed to a bearing housing 200 provided separately from the base 2 as illustrated in FIG. 2. In FIG. 2, the circuit board 100 on which the acceleration sensor 101 is mounted is screwed to an inner peripheral surface of a cover 201 attached to the bearing housing 200. Vibration of the ball bearing 8 is transmitted to the acceleration sensor 101 on the circuit board 100 through the bearing housing 200 and the cover 201.

Figure 3:
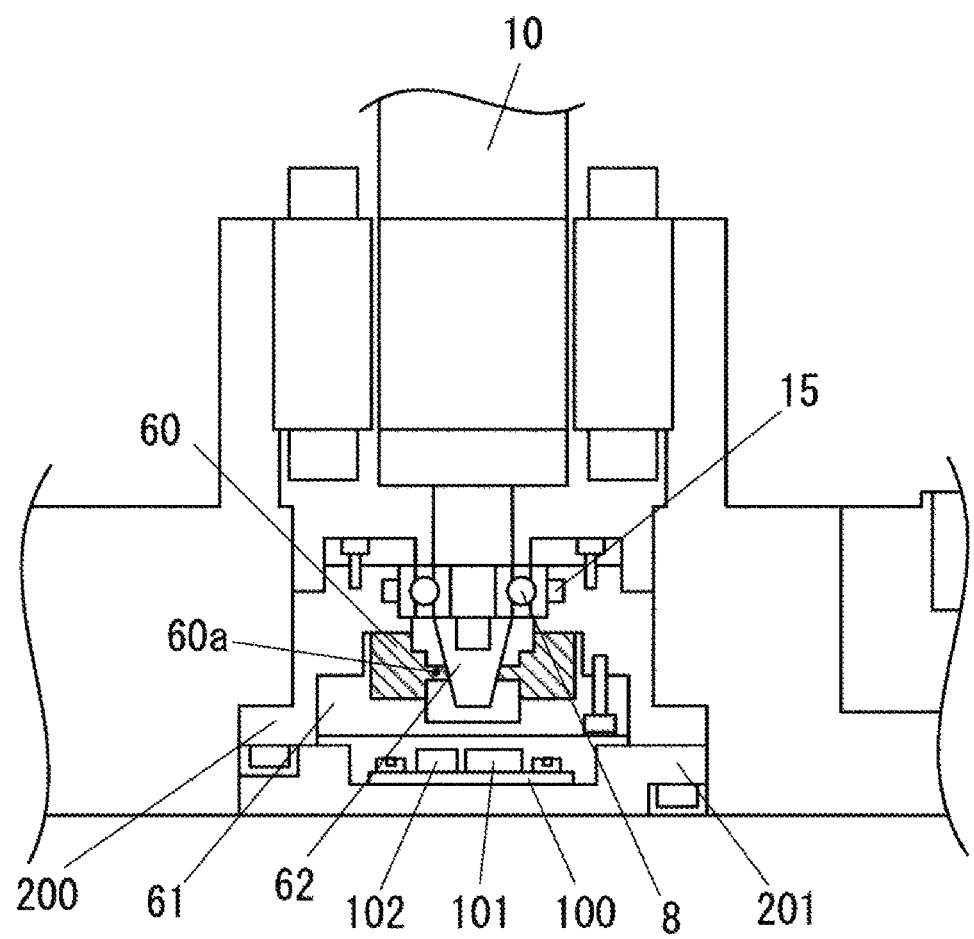
FIG. 3 is a view of a circuit board arrangement example in the case of using an oil lubrication type ball bearing.

Moreover, the ball bearing 8 is lubricated with grease in FIGS. 1 and 2, but FIG. 3 illustrates a configuration in a case where the ball bearing 8 is lubricated with oil. The ball bearing 8 is held by the bearing housing 200 bolted to the base 2. The ball bearing 8 is an oil lubrication type rolling bearing, and includes a wick 60 as a lubricant oil storage section for supplying lubricant oil to the ball bearing 8. The wick 60 includes a felt-like or sponge-like member which can hold lubricant oil, and holds lubricant oil. The wick 60 is provided at a holding portion 61.

The inner ring of the ball bearing 8 is fixed to the shaft 10 with a cone-shaped nut 62. An outer peripheral surface of the nut 62 defines a tapered surface from a side contacting the inner ring of the ball bearing 8 toward a tip end. A contact portion 60a protruding inward is formed on an inner peripheral side of the wick 60, and the contact portion 60a contacts the outer peripheral surface of the nut 62. When the nut 62 rotates at high speed together with the shaft 10, lubricant oil adhering to the outer peripheral surface of the nut 62 moves in the direction of the ball bearing 8 on the tapered outer peripheral surface due to centrifugal force, and eventually, is supplied into the inner ring of the ball bearing 8.

In the case of providing the oil lubrication type ball bearing 8, the circuit board 100 on which the acceleration sensor 101 is mounted is also fixed to the cover 201 attached to the bearing housing 200 by, e.g., screwing. Vibration of the ball bearing 8 is transmitted to the acceleration sensor 101 on the circuit board 100 through the bearing housing 200 and the cover 201.

Figure 4:
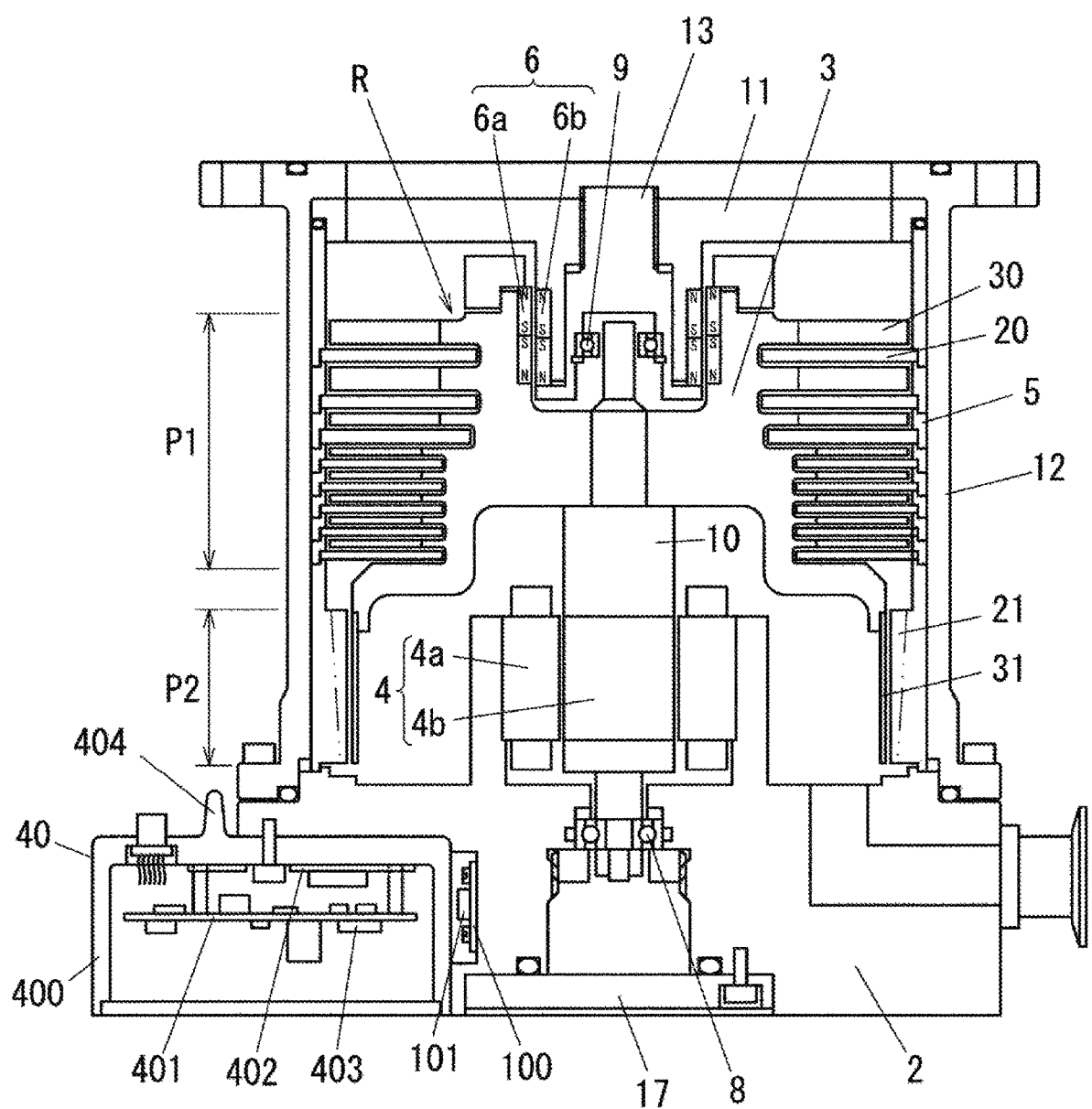
FIG. 4 is a view of a circuit board arrangement example in the case of a power supply integrated turbo-molecular pump.

FIG. 4 illustrates one example of arrangement of the circuit board 100 in the case of a power supply integrated turbo-molecular pump configured such that a power device 40 is fixed to the base 2 of the turbo-molecular pump 1. A housing 400 of the power device 40 is bolted to the base 2. Substrates 401, 402 are provided in the housing 400, and a microcomputer 403 is mounted on the substrate 401. The substrate 402 is fixed to an inner peripheral surface of the housing 400, and an electronic component with a relatively-great heat generation amount is mounted on the substrate 402. Multiple radiation fins 404 are formed on an outer peripheral surface of the housing 400.

The circuit board 100 on which the acceleration sensor 101 is mounted is fixed to an outer surface of the base 2 facing the housing 400. Thus, the circuit board 100 is hidden behind the housing 400, and an outer appearance thereof is not visible. In the example illustrated in FIG. 4, the microcomputer 102 for the vibration sensor is not mounted on the circuit board 100, and the microcomputer 403 provided at the power device 40 also has the function of the microcomputer 102.

Figure 5:
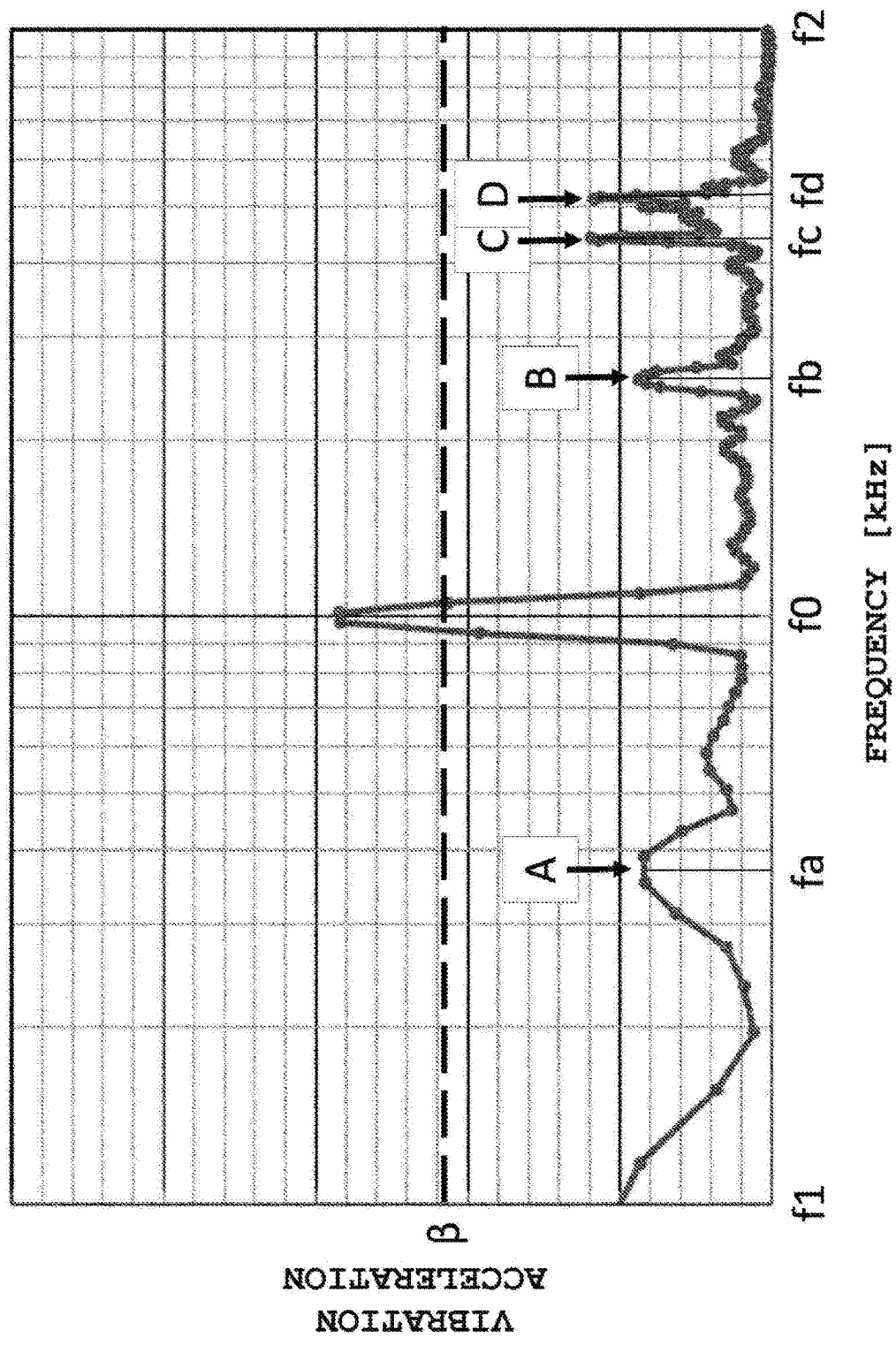
FIG. 5 is a graph of one example of a vibration measurement result.

FIG. 5 is a graph of one example of a vibration measurement result of the ball bearing 8 when the pump rotor 3 rotates at high speed. In FIG. 5, the horizontal axis represents a frequency, and the vertical axis represents a vibration acceleration. A frequency f0 is a frequency (hereinafter referred to as a "rotor rotation frequency") corresponding to a rotor rotation speed, and N=60×f0 is satisfied when a pump rotation speed is N (rpm). For example, when the rotor rotation speed is 60,000 (rpm), f0=1 (kHz) is satisfied. Data illustrated in FIG. 5 is vibration data in a case where deterioration of the ball bearing 8 is accelerated, and peaks indicated by reference characters A, B, C, D are shown other than the peak of the rotor rotation frequency f0.

When data output from the acceleration sensor 101 is FFT-processed by the microcomputer 102, peaks are shown at the frequency corresponding to the rotor rotation speed and multiples thereof and a frequency regarding a component (the outer ring, the inner ring, a rolling body, and a holder) forming the ball bearing 8. The peaks A to D of FIG. 5 are vibration acceleration peaks due to the components forming the ball bearing 8, and the frequencies fa to fd of the acceleration peaks A to D will be hereinafter referred to as "bearing vibration frequencies." The frequencies (the bearing vibration frequencies) fa to fd at the peak positions depend on the rotor rotation frequency f0, and are shown within a limited frequency range including the acceleration peaks A to D and the rotor rotation frequency f0.

In the example illustrated in FIG. 5, the bearing vibration frequencies fa to fd are shown within a frequency range of equal to or lower than a frequency f2. When the rotor rotation frequency f0 changes, the bearing vibration frequencies fa to fd change accordingly. In the case of f0=1 (kHz), the frequency f2 is about 10 (kHz). In a case where a diagnosis is made on deterioration of the ball bearing 8 based on vibration detected by the acceleration sensor 101, the frequency f2 is, for example, set to the upper frequency limit of a diagnosis target frequency.

The acceleration sensor 101 is mounted on the circuit board 100, and the circuit board 100 is, by screwing, fixed to the base 2, the back cover 17 fixed to the base 2, and the cover 201 fixed to the bearing housing 200 as illustrated in FIGS. 1 to 4, for example. Thus, when the circuit board 100 vibrates, the acceleration sensor 101 also detects vibration of the board itself.

The acceleration sensor 101 and the microcomputer 102 configured to process the vibration data output from the acceleration sensor 101 are mounted on the circuit board 100, and a space for mounting at least the acceleration sensor 101 and the microcomputer 102 is necessary. In a case where the general glass epoxy resin substrate is used as the circuit board 100, the stiffness of the board itself is relatively low, and for this reason, there is a probability that the resonant frequency of the circuit board 100 in a state in which the circuit components are mounted on the circuit board 100 is lower than the frequency f2 of FIG. 5. When a board thickness is increased, the resonant frequency can be increased. However, the arrangement space of the circuit board 100 in the turbo-molecular pump 1 is limited as illustrated in FIGS. 1 to 4, and therefore, it is difficult to increase the board thickness to a necessary thickness.

For this reason, in the present embodiment, the metal base substrate having high stiffness is used as the circuit board 100, and therefore, necessary stiffness is obtained while the board thickness is reduced. Since the stiffness of the circuit board 100 is increased, a broader board area can be ensured while a high resonant frequency can be maintained. Thus, there is an extra space for mounting the acceleration sensor 101 and the microcomputer 102. The thickness and dimensions of the metal base substrate are set according to the frequency f2 of FIG. 5.

Figure 6:
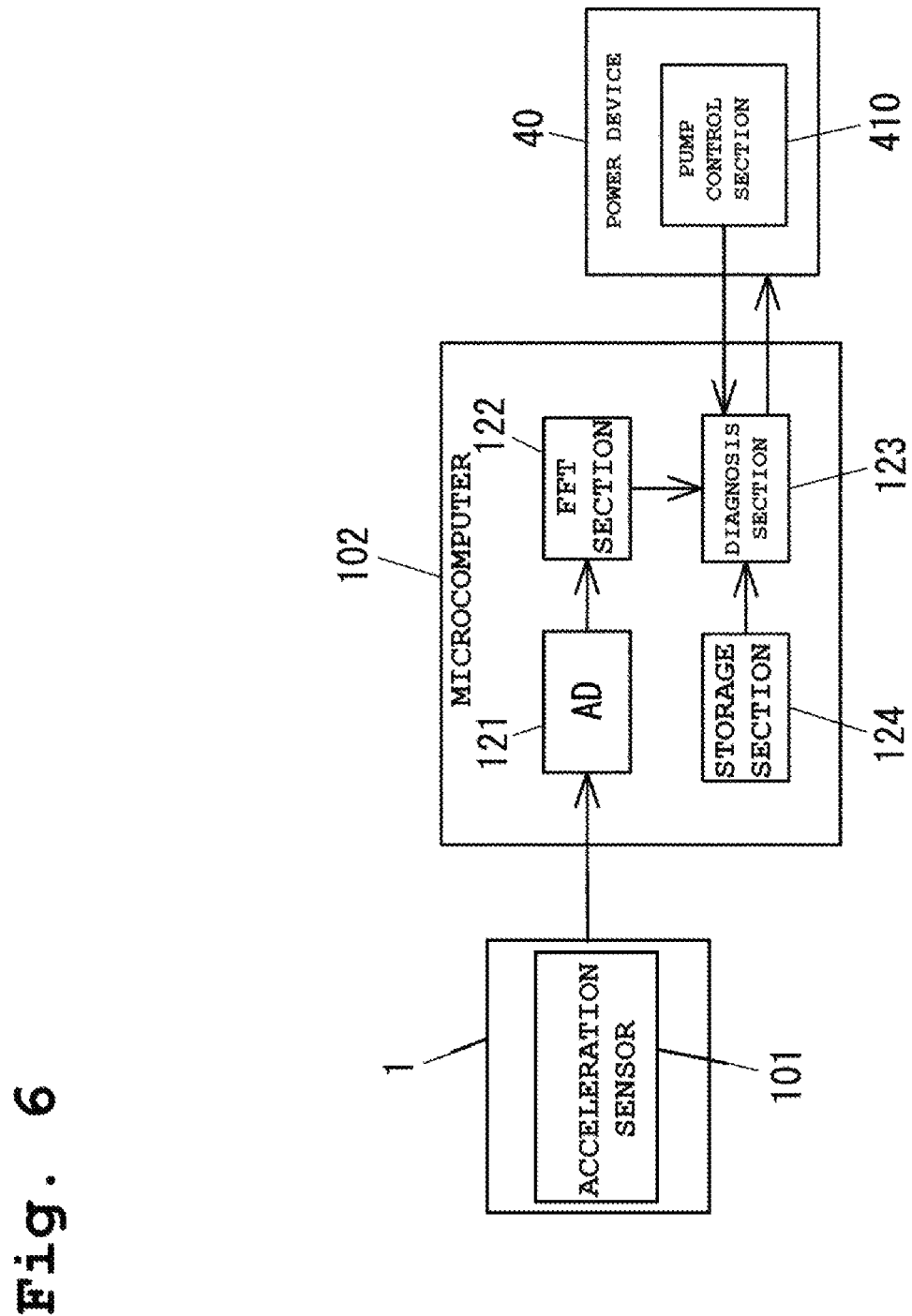
FIG. 6 is a block diagram of one example of a diagnosis system.

FIG. 6 is a block diagram of one example of a deterioration diagnosis system for the ball bearing 8, the system utilizing vibration information detected by the acceleration sensor 101. An analog output signal of the acceleration sensor 101 is taken into the microcomputer 102 by an AD conversion section 121. The AD-converted signal is subjected to Fourier transform processing in an FFT section, and the vibration data illustrated in FIG. 5 is obtained. A diagnosis section 123 is configured to make the diagnosis on deterioration of the ball bearing 8 based on the vibration data after the Fourier transform processing. For example, in a case where the levels of the accelerations at the peaks A to D are equal to or higher than a threshold β, it is diagnosed as the timing of replacing the ball bearing 8.

A storage section 124 of the microcomputer 102 is configured to store frequency correlation information on a relationship among the rotor rotation frequency f0 of the turbo-molecular pump 1 and the bearing vibration frequencies fa to fd due to the ball bearing 8, the above-described threshold β used for the diagnosis on bearing deterioration and the like. The rotor rotation frequency f0 is input from a pump control section 410 of the power device 40 to the diagnosis section 123. Note that the diagnosis section 123 may extract the rotor rotation frequency f0 based on the vibration data input from an FFT section 122. Even in a case where the used rotation speed of the turbo-molecular pump 1 is different from a rated rotation speed, the bearing vibration frequencies fa to fd corresponding to the rotor rotation frequency f0 at the moment are extracted.

The diagnosis section 123 extracts the bearing vibration frequencies fa to fd from the vibration data based on the rotor rotation frequency f0 and the frequency correlation information input to the storage section 124, and constantly monitors these frequencies. When deterioration of the ball bearing 8 is accelerated, vibration due to the ball bearing 8 becomes greater, and the levels of the peaks of the bearing vibration frequencies fa to fd illustrated in FIG. 5 increase. Thus, in a case where the acceleration values for the monitored bearing vibration frequencies fa to fd reach equal to or greater than the threshold β, the diagnosis section 123 outputs an alarm signal regarding bearing deterioration.

In the example illustrated in FIG. 5, the alarm signal is input to the power device 40. However, the alarm signal may be output to a main controller of a vacuum device attached to the turbo-molecular pump 1, or may be transmitted to a server through, e.g., the Internet. Moreover, in FIG. 5, it is configured to make the deterioration diagnosis by the microcomputer 102 of the circuit board 100, but the diagnosis processing performed by the diagnosis section 123 may be performed by the pump control section 410 or the server. In this case, a processing result (i.e., the vibration data illustrated in FIG. 5) of the FFT section 122 is output from the microcomputer 102, and the processing of making the diagnosis on bearing deterioration is performed by the pump control section 410 or the server.

Second Embodiment

Figure 7:
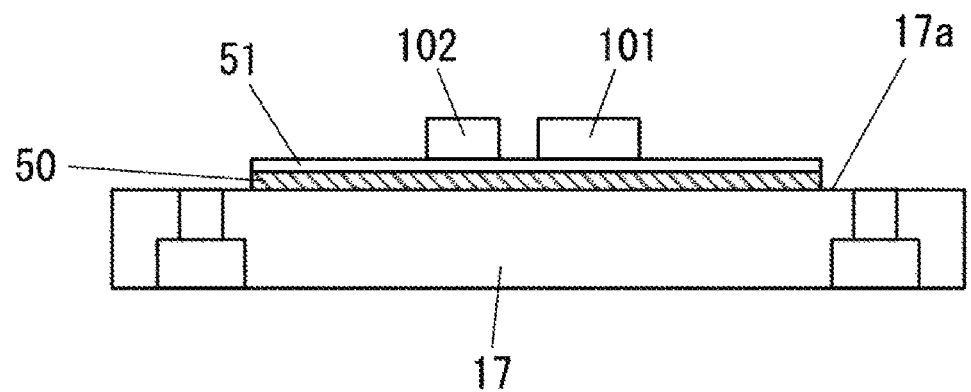
FIG. 7 is a view of a second embodiment.

FIG. 7 is a view of a second embodiment. In the above-described first embodiment, the metal base substrate is used as the circuit board 100 on which the acceleration sensor 101 and the microcomputer 102 are mounted, and therefore, influence of vibration of the circuit board on the vibration data of the acceleration sensor 101 is eliminated. On the other hand, in the second embodiment illustrated in FIG. 7, electronic components such as an acceleration sensor 101 and a microcomputer 102 are directly mounted on an inner peripheral surface 17a of a back cover 17 provided at a base 2 of a turbo-molecular pump 1.

An insulating layer 50 similar to that in the case of the metal base substrate is formed on the inner peripheral surface 17a of the back cover 17, and a wiring layer 51 made of copper foil is formed on the insulating layer 50. For example, an aluminum alloy material or a stainless steel material is, in the turbo-molecular pump 1, generally used for the back cover 17 corresponding to the base metal in the case of the metal base substrate, and the thickness of the back cover 17 is about 10 mm. Thus, in comparison with the metal base substrate used in the first embodiment, sufficiently-high stiffness is obtained. As a result, even in a case where vibration occurs at the back cover 17 on which the acceleration sensor 101 is mounted, the frequency of vibration is on a higher frequency side with respect to the upper frequency limit f2 illustrated in FIG. 5, and influence of vibration on the back cover 17 within a frequency range to be monitored can be prevented.

The vacuum pump described in the embodiments above will be collectively described as follows.

(1) In the turbo-molecular pump 1 configured such that the shaft 10 provided at the pump rotor 3 is supported by the ball bearing 8 as the rolling bearing, the acceleration sensor 101 is provided as the vibration sensor configured to detect vibration of the ball bearing 8. As a result, a deterioration state of the ball bearing 8 can be recognized based on the vibration information output from the acceleration sensor 101, and therefore, maintenance of the ball bearing 8 can be properly performed.

(2) As illustrated in FIG. 4, the acceleration sensor 101 is mounted on the circuit board 100 using metal as a board base material, such as the metal base substrate, and the circuit board 100 is fixed to the base 2 provided with the ball bearing 8. The resonant frequency of the circuit board 100 on which the acceleration sensor 101 is mounted is set higher than the frequency range (a frequency range of equal to or lower than the frequency f2 in FIG. 5) of vibration due to the ball bearing 8. As a result, no vibration peak of the circuit board 100 is shown in the frequency range of vibration due to the ball bearing 8, and therefore, vibration due to the ball bearing 8 can be easily identified from the vibration data of the acceleration sensor 101 without the influence of vibration of the circuit board 100.

Note that the present invention is not limited to the configuration in which the circuit board 100 is directly fixed to the base 2 as illustrated in FIG. 4. The circuit board 100 may be fixed to the back cover 17 fixed to the base 2 as in FIG. 1, or the circuit board 100 may be fixed to the cover 201 fixed to the bearing housing 200 as in FIGS. 2 and 3.

(3) As illustrated in FIG. 7, the acceleration sensor 101 may be mounted on the back cover 17 forming part of the base 2. The insulating layer 50 is formed on the inner peripheral surface 17a of the back cover 17, and the acceleration sensor 101 and the microcomputer 102 are mounted on the wiring layer 51 formed on the insulating layer 50. The resonant frequency of the back cover 17 on which the acceleration sensor 101 is mounted is set higher than the frequency range including the bearing vibration frequencies fa to fd of the ball bearing 8, and therefore, vibration due to the ball bearing 8 can be easily identified from the vibration data of the acceleration sensor 101.

(4) In the diagnosis system illustrated in FIG. 6, the diagnosis section 123 makes the diagnosis on deterioration of the ball bearing 8 based on the vibration detection information output from the acceleration sensor 101 provided at the turbo-molecular pump 1. As a result, the process of replacing the ball bearing 8 can be performed at proper timing.

Further, the resonant frequencies of the circuit board 100 on which the acceleration sensor 101 is mounted and the back cover 17 of FIG. 7 are set higher than the frequency range including the bearing vibration frequencies fa to fd of the ball bearing 8, and the vibration detection information output from the acceleration sensor 101 does not include the influence of vibration due to the ball bearing 8. As a result, the diagnosis on deterioration of the ball bearing 8 can be easily made.

Various embodiments and the variations have been described above, but the present invention is not limited to these contents. Other aspects conceivable within the scope of the technical idea of the present invention are also included in the scope of the present invention.

What is claimed is:

1. A vacuum pump comprising:
   a rotor;
   a stator;
   a rolling bearing configured to support a rotor shaft provided at the rotor;
   a vibration sensor configured to detect vibration of the rolling bearing;
   a base provided with the rolling bearing; and
   a circuit board directly fixed to the base or fixed to the base through other members, the vibration sensor being mounted on the circuit board,
   wherein a resonant frequency of the circuit board is set higher than a frequency range of vibration of the rolling bearing.

2. The vacuum pump according to claim 1, further comprising:
   a computer configured to make, based on vibration detection information output from the vibration sensor, a diagnosis on a presence or absence of deterioration of the rolling bearing.

3. The vacuum pump according to claim 2, wherein:
   the computer performs FFT processing for data output from the vibration sensor, thereby acquiring a peak at a rotor rotation frequency and a peak at a bearing vibration frequency regarding a component forming the rolling bearing, and
   the computer makes the diagnosis on the presence or absence of deterioration of the rolling bearing based on the peak at the bearing vibration frequency among the peaks acquired by the FFT.

4. The vacuum pump according to claim 3, wherein
   the computer includes a storage configured to store frequency correlation information on a relationship between the rotor rotation frequency and the bearing vibration frequency,
   wherein the computer identifies the bearing vibration frequency based on a current rotor rotation frequency and the frequency correlation information stored in the storage, thereby making the diagnosis on the presence or absence of deterioration of the rolling bearing based on the peak at the identified bearing vibration frequency.

5. The vacuum pump according to claim 3, wherein
   the computer includes a storage configured to store a threshold, and
   the computer makes such a diagnosis that the rolling bearing has been deteriorated when the peak at the bearing vibration frequency is determined to be equal to or higher than the threshold stored in the storage.

6. The vacuum pump according to claim 1, wherein the circuit board is metal.

7. A vacuum pump comprising:
a rotor;
a stator;
a rolling bearing configured to support a rotor shaft provided at the rotor;
a vibration sensor configured to detect vibration of the rolling bearing;
a base provided with the rolling bearing; and
a back cover fixed to the base and including a back cover main body, an insulating layer, and a wiring layer,
wherein the vibration sensor is mounted on the wiring layer of the back cover, and
a resonant frequency of the back cover is set higher than a frequency range of vibration of the rolling bearing.

* * * * *